United States Patent [19]

Davis et al.

[11] Patent Number: 5,060,106
[45] Date of Patent: Oct. 22, 1991

[54] DISK CARTRIDGE INCLUDING DOOR OPENING MECHANISM AND IMPROVED HUB ASSEMBLY

[75] Inventors: Marvin B. Davis, Colorado Springs, Colo.; Hendrikus W. C. M. Peeters, Hapert, Netherlands; Wilhelm Taylor, Colorado Springs, Colo.

[73] Assignee: Laser Magnetic Storage International Company, Colorado Springs, Colo.

[21] Appl. No.: 434,904

[22] Filed: Nov. 13, 1989

[51] Int. Cl.$^5$ ............................................ G11B 23/02
[52] U.S. Cl. ...................................... 360/133; 360/86; 360/97.01
[58] Field of Search ...................... 360/132, 133, 97.01, 360/137, 86

[56] References Cited

U.S. PATENT DOCUMENTS

| | | | |
|---|---|---|---|
| 3,529,301 | 9/1970 | Hiruta | 340/174.1 |
| 4,078,246 | 3/1978 | Berthoux et al. | 360/133 |
| 4,358,801 | 11/1982 | Faber et al. | 360/97 |
| 4,378,576 | 3/1983 | Roling | 360/137 |
| 4,399,480 | 8/1983 | Edwards | 360/132 |
| 4,412,260 | 10/1983 | Stricklin et al. | 360/97 |
| 4,445,155 | 4/1984 | Takahashi | 360/99 |
| 4,503,474 | 3/1985 | Nigam | 360/133 |
| 4,503,530 | 3/1985 | Hinlein et al. | 369/270 |
| 4,571,718 | 2/1986 | Cahill et al. | 360/291 |
| 4,604,664 | 8/1986 | Barski | 360/97 |
| 4,682,322 | 7/1987 | Ohta | 369/291 |
| 4,694,363 | 9/1987 | Nakamori et al. | 360/99 |
| 4,695,910 | 9/1987 | Maruyama et al. | 360/133 |
| 4,717,981 | 1/1988 | Nigam et al. | 360/133 |
| 4,724,962 | 2/1988 | Watanabe et al. | 206/444 |
| 4,742,419 | 5/1988 | Kato | 360/133 |

*Primary Examiner*—John H. Wolff
*Attorney, Agent, or Firm*—Sheridan, Ross & McIntosh

[57] ABSTRACT

A disk cartridge having a housing in which a disk is rotatably mounted via a hub assembly. The housing includes two cover plates, each of which has a door aperture that is selectively covered by a door that is controlled by a dedicated door control assembly. When the cartridge is inserted into a disk drive, each door is opened by its respective door opening assembly such that both sides of the disk are accessible for magnetic or optical read/write operations.

In the preferred embodiment, the hub assembly includes two hub halves, at least one of which includes a plurality of resilient fingers for leveling a surface of the disk when the cartridge is contained within the disk drive. At least one of the hub halves also includes a channel having a plurality of pockets formed therein such that when a spindle base having a torque transferring element is positioned adjacent to the pockets, one of the pockets is able to substantially immediately receive the torque transferring element.

3 Claims, 9 Drawing Sheets

DISK CARTRIDGE INCLUDING DOOR OPENING MECHANISM AND IMPROVED HUB ASSEMBLY

FIELD OF THE INVENTION

The present invention relates to a disk cartridge, for use in a disk drive.

BACKGROUND OF INVENTION

Disks are typically employed with disk drives for reading and writing data thereon. The disk or disks, in one embodiment, are removable while, in another embodiment are not intended to be removed by the user. In the case of removable disks, they are housed within a cartridge to facilitate handling and storage as well as to protect surfaces of the disks during installation and removal from the disk drive. As is known, the cartridge serves to seal the disk assembly from airborne contaminants and prevents unwanted contact with the disk surfaces.

In the most common example, the disk cartridge has at least one access opening through which a magnetic or optical read/write head can be received to record or read information on a surface of the disk. To prevent the collection of dust and/or fingerprints on the disk surface during periods in which the cartridge is not contained within a disk drive, a shutter or cover door, such as that shown in Nigam U.S. Pat. No. 4,503,474, is usually employed. As illustrated in the Nigam patent, the cover door is normally positioned across the access opening to seal the same, but can be retracted from the opening to permit access by a read/write head to one side of the disk.

In particular, the Nigam cartridge includes a camming arrangement which allows for automatic opening of the door as the cartridge is inserted into the disk drive unit. The Nigam camming arrangement, which is conceptually similar to door opening arrangements disclosed in Edwards U.S. Pat. No. 4,399,480 and Nigam, et al., U.S. Pat. No. 4,717,981, includes a cam arm and lever which are operatively connected to the door by way of a linking member. The camming arrangement is spring biased such that in a first position the door covers the access opening and in a second position the door is displaced with respect to the access opening such that optical or magnetic read/write operations can be performed with the disk. The cartridge includes an opening which is aligned with the cam arm such that when a cartridge is inserted within the disk drive the cam arm contacts a member disposed within the disk drive so that the camming arrangement urges the door into the second position.

While the door opening arrangement disclosed in Ohta U.S. Pat. No. 4,682,322 employs principles similar to that employed by the Nigam camming arrangement, the Ohta door(s) opening arrangement includes a rack and pinion assembly rather than a camming arrangement. More specifically, a transmission mechanism within the cartridge links a first rack and a second rack. The second rack is secured to a shutter, which is adapted to selectively cover an access opening overlying the disk, and the first rack is adapted to contact a projection as the disk is inserted into a disk drive. When the disk is not in use, the shutter, which is spring biased, covers the access opening. As the cartridge is inserted into the disk drive, the projection displaces the first rack, and consequently the second rack, such that the shutter is pulled away from the opening.

For a typical cartridge, the disk is mounted on a hub which, in turn, is mounted in an opening disposed within the housing of the cartridge so that the hub can engage with a spindle of the disk drive unit. There are various known arrangements for coupling the spindle with the hub. Typically, as illustrated in Takahashi, et al., U.S. Pat. No. 4,445,155, Nigam, U.S. Pat. No. 4,503,474, Nakamori, et al., U.S. Pat. No. 4,694,363, Maruyama, et al., U.S. Pat. No. 4,695,910 and Kato, U.S. Pat. No. 4,742,419, the hub includes a centering hole for receiving a spindle which includes a spindle supporting member and shaft. In Nakamori, et al., and Takahashi, et al., the hub is held to the spindle supporting member through the employment of one or more permanent magnetic pieces arranged about the spindle supporting member. On the other hand, in Maruyama, et al. and Kato the hub is secured within the disk drive by sandwiching it between the spindle supporting member and a collet.

Berthoux, et al., U.S. Pat. No. 4,078,246 discloses a coupling arrangement which may, for example, employ magnetic attraction, as with the Takahashi, et al. coupling arrangement. In particular, Berthoux, et al., discloses an arrangement which provides for air circulation within the cartridge while the disk is being rotated. That is, the Berthoux, et al., cartridge is characterized by opposing deformable walls which seal off the hub and disk when the cartridge is not in use, but allow for the formation of vents when the cassette is inserted into the disk drive. Moreover, the arrangement disclosed by Berthoux, et al. prohibits rotation of the disk when the cartridge is not being used in the disk drive.

The disk may be rotated through use of the spindle or a torque transferring member associated therewith. With the Nakamori, et al. and Nigam cartridges, for example, torque transfer is achieved through use of the spindle shaft alone. In particular, the spindle shaft is forcibly pressed into the centering hole which is slightly undersized relative to the spindle diameter. In contrast, torque transfer with the Maruyama, et al., Takahashi, et al. and Kato cartridges is achieved through employment of a drive shaft spaced from the spindle shaft. While each of the Maruyama, et al. and Takahashi et al. drive shafts are secured in a single drive pin insertion hole, the Kato drive shaft is positioned through use of an annular guide groove formed around the centering hole for the spindle and a rib. That is, the drive shaft is initially received by the guide groove and rides along the groove until it contacts, and is accordingly seated against, a wall formed by a rib.

SUMMARY OF THE INVENTION

A cartridge is provided in which a disk is rotatably mounted via a hub assembly. The cartridge includes two cover plates which are fastened together to form a housing in which the disk and hub assembly are secured. Each of the cover plates has a door aperture which is selectively covered by a door that is controlled through use of a dedicated door control assembly. As the cartridge is inserted into a disk drive, each door is opened through use of the dedicated door control assembly such that each surface of the disk can be accessed by a dedicated optical or magnetic read/write head.

In the preferred embodiment, the door control assemblies are aligned along an axis which is normal to the central axis of the cartridge. Additionally, the hub assembly includes two hub sub-assemblies which are structurally equivalent and symmetrically disposed about the disc. Consequently, it does not matter which way the cartridge is inserted into the disk drive as long as the cover plate surfaces face the optical read/write heads.

Each of the hub subassemblies, which includes a receiving aperture, preferably includes a set of resilient fingers, each of which extends radially from the receiving aperture. When the cartridge is not in use, end portions of the fingers are slightly raised relative to a predetermined plane and each finger is spaced away from the disk surface. When the hub assembly is brought into contact with a raised portion of a spindle support base, the fingers are slightly depressed such that portions of the fingers contact one of the surfaces of the disk and level the disk for precise operation and accurate read/write function.

Moreover, each hub includes a plurality of pockets annularly disposed relative to the receiving hole which are adapted to seat a torque transfer element substantially simultaneously to the element being brought into contact with the hub assembly. Accordingly, there is little or no searching to find the proper seating position for the element.

It is an advantage of the present invention that the cartridge conveniently provides for reading and writing operations on both sides of the disk by dedicated optical read/write heads. In particular, as long as a pre-designated leading edge of the cartridge is appropriately inserted into the disk drive, two sided reading and writing is accomplished regardless of the orientation of the cartridge cover plate surfaces to the read/write heads.

It is another advantage of the present invention that forces generated between contact bumps associated with the disk drive and the door control assemblies, in response to inserting the cartridge into the disk drive, are balanced. That is, forces that are equal in magnitude and opposite in direction are generated normal to the central axis of the cartridge such that torquing of the cartridge within the disk drive is alleviated. Moreover, since little or no forces are generated, coaxial to the central axis of the cartridge, the tendency of the cartridge to be expelled from the disk drive is alleviated.

It is another advantage of the present invention that wear and tear on the hub subassemblies is minimized by providing each hub with a plurality of pockets. In particular, the presence of multiple pockets allows a torque transferring element to engage the hub within a relatively short period of time. Hence, the torque transferring element, which may be metallic in construction, is not scraped along a surface of the hub, which may be constructed of a plastic or the like, in an effort to achieve a seated position.

It is another advantage of the present invention that as the hub assembly is brought into contact with the spindle of the drive means for the disk drive, the disk is automatically leveled for precise positioning of the disk relative to the read/write heads. That is, when the hub contacts a raised portion of the spindle support base, portions of the resilient fingers, spaced about the hub subassemblies, abut one of the surfaces of the disc, providing a "pedestal" effect. Hence, accurate reading of the leveled disk by the optical read/write head(s) is assured.

These and other features, advantages and objects of the present invention will be further understood and appreciated by those skilled in the art by reference to the following written specification, and appended drawings.

DETAILED DESCRIPTION

Figure 1:
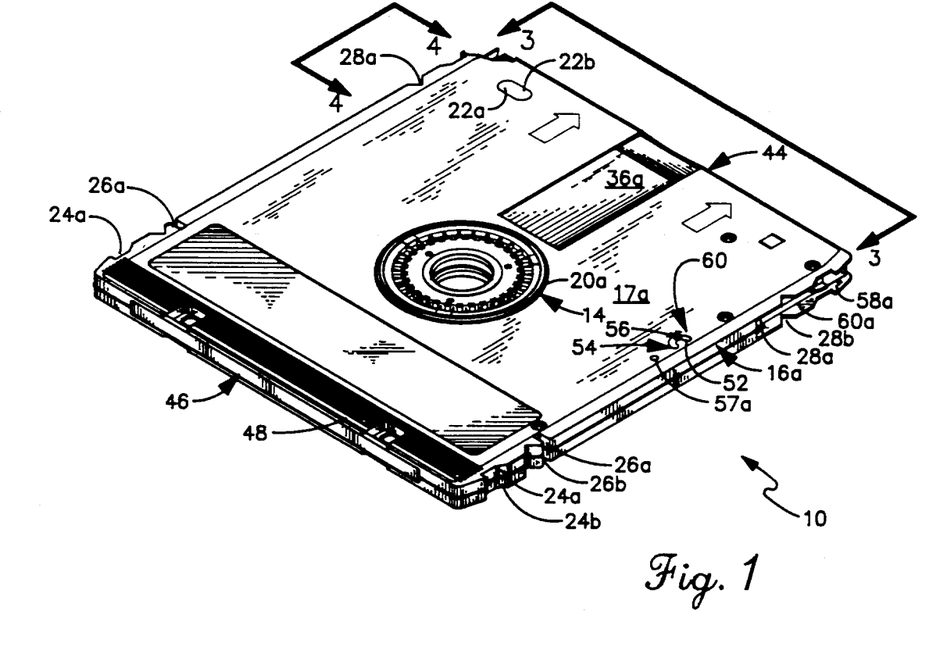
FIG. 1 is a top-elevational, isometric view of a cartridge for use in a disk drive embodying the present invention.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations and step sequences, except where expressly specified to the contrary. It is also be to understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims, by their language, expressly state otherwise.

The reference numeral 10 (FIG. 1) generally designates a cartridge for a disk drive assembly embodying the present invention. As further illustrated by FIGS. 7 and 8, a disk 12 is rotatably mounted within Cartridge 10 by way of hub assembly 14. In the preferred embodiment, cartridge 10 includes various assemblies, mechanisms and parts that are duplicated. When such duplication arises, the assemblies, mechanisms or parts being duplicated will be designated with similar numerals having a smaller case suffix such as "a", "b" and so on. In these cases only the assemblies, mechanisms or parts associated with the "a" suffix will be discussed since it will be understood that all assemblies, mechanisms and parts having similar numerals are structurally equivalent.

Cartridge 10 is particularly adapted for use in a disk drive employing two optical read/write heads to read or write on both sides of disk 12. It will of course be appreciated, in view of the discussion below, that read/write operations could be advantageously performed with cartridge 10 using another system in which a read/write head is only provided on one side of the disk drive. In one preferred example, the disk drive includes two separate read/write heads each of which can be positioned to read one side of disk 12. As can be appreciated by those skilled in the art, when each side of disk 12 is serviced by a head that is capable of both reading and writing, the flexibility of the disk drive arrangement is greatly enhanced. For instance, both sides of disk 12 can be read simultaneously. Cartridge 10 includes a first half or cover plate 16a and a second cover plate 16b. Cover plate 16a, having a surface 17a, defines door aperture 18a (FIGS. 2 and 3) as well as hub aperture 20a.

Figure 2:
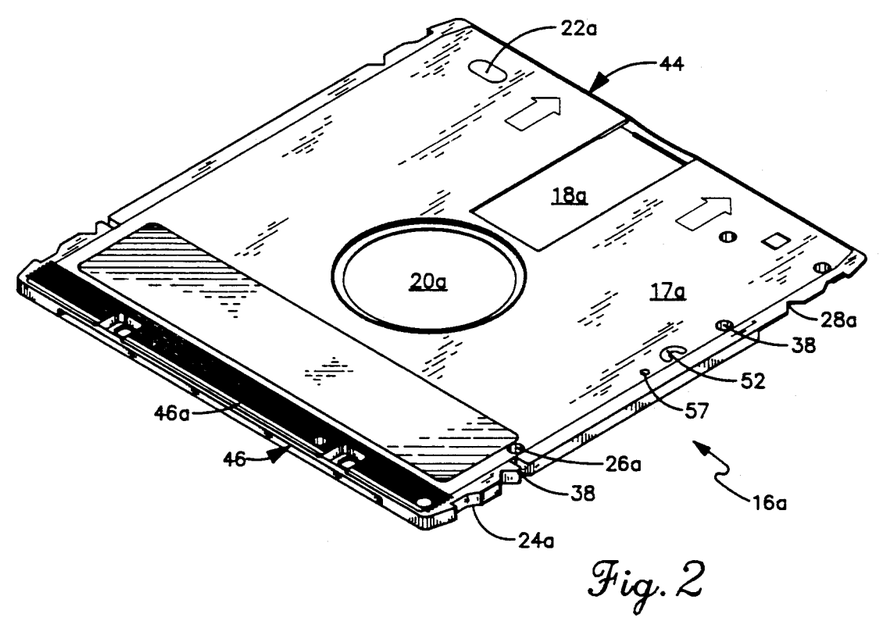
FIG. 2 is a partial, top-elevational, isometric view of one of two cover plates used to construct the cartridge.

As illustrated in FIG. 2, cover plate 16a is configured with various jukebox features, which function cooperatively with equivalent features configured on cover plate 16b, to render cartridge 10 adaptable for jukebox function, as described in copending U.S. patent application Serial No. 07/432,914, filed on Nov. 6, 1989 and entitled "Mass Loader Mechanism For Use With Digital Storage Devices." Such jukebox features include detente hole 22a, jukebox gripper 24a as well as shuttle engagement notch 26a and side notch 28a. As should be appreciated, a plurality of cartridges 10 can be used in a crypt wherein one of the cartridges can be inserted and/or removed from the disk drive through, in part, use of grippers 24a and 24b as well as notches 26a, 26b and 28a, 28b. Moreover, guide tracks (not shown) can be provided along cover plate 16a to facilitate movement of cartridge 10 from or to the disk drive during jukebox operation.

Door aperture 18a is selectively covered by door 36a (FIGS. 1 and 3) when cartridge 10 is not in use, and is opened, as described below, when disk 36 is being read by or written upon by the optical heads. In the preferred embodiment, cover plate 16a includes a plurality of apertures 38 (FIG. 2) and a plurality of posts 39 (FIG. 5) which are mounted upon an interior surface of cover plates 16b. The apertures 38 and posts 39 are positioned such that cover plates 16a and 16b can be secured together through use of conventional fasteners, such as screws 40.

In one example, cartridge 10 has a leading edge 44, and a lagging edge 46. In the preferred embodiment, door aperture 18a and door 36a (FIG. 3) are positioned toward the leading edge 44 of cartridge 10. A gripping surface 48a, for facilitating insertion of cartridge 10 into the disk drive is formed along the lagging edge 46.

A write protect arrangement 50 (FIGS. 1 and 2) is provided on surface 17a of cover plate 16a. The write protect arrangement 50 includes an aperture 52 which receives a slide piece 54 for selectively covering the aperture 52. A dimple 56 is mounted on slide piece 54 for moving the same relative to aperture 52. As is known, aperture 52 and slide piece 54 cooperate to provide write protection. In particular writing on the disk can be prevented, depending on the way in which the disk drive is programmed, when the slide piece 54 is either opened or closed with respect to aperture 52. As will be appreciated from the discussion below, write protect arrangement 50 could be formed along other locations of cover plate 16a near the sides thereof without hindering the write protect operation. Additionally, an A/B select aperture 57a for determining the orientation of cover plate surface 17a to the read/write head(s), and thus whether disk 12 should be rotated in a clockwise or counter-clockwise direction, is provided along a side edge of cover plate 16a.

Figure 3:
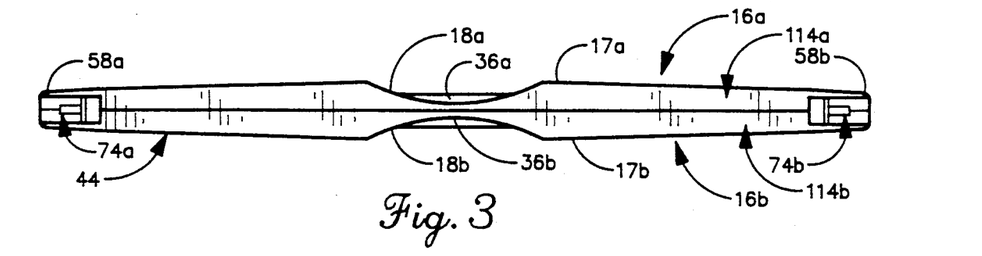
FIG. 3 is a side-elevational view of the cartridge taken along the plane 3—3 of FIG. 1.
Figure 4:
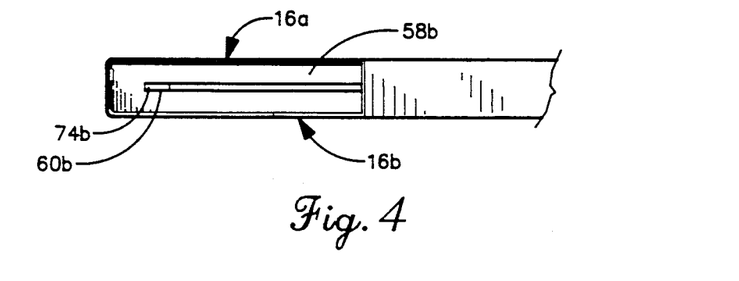
FIG. 4 is a side-elevational view of the cartridge taken along the plane 4—4 of FIG. 1.

As further illustrated by FIGS. 1, 3 and 4, when cover plates 16a and 16b are fastened together, recesses 58a and 58b as well as slots 60a and 60b are formed. The significance of these structures will be discussed in further detail below.

Door control assemblies 64a (FIGS. 5 and 6) and 64b are provided for controlling the opening and closing of door 36a and door 36b, respectively. In the preferred embodiment, door control assemblies 64a and 64b are mirror symmetric about a central axis 66 and positioned along an axis which is normal to central axis 66. The significance of such positioning is discussed below.

Door control assembly 64a includes a control arm 68a, an interconnecting link 70a and a biasing mechanism 72a. The control arm 68a is, in one example, an integral piece having a camming arm 74a and a lever 76a. Cover plate 16a is provided with a post 80a along its interior surface about which control arm 66a is pivotally mounted. One end of camming arm 74a (FIGS. 1, 3 and 4) extends through slot 60a. In one example, another post 82a is provided near leading edge 44 of the interior surface of cartridge 10 to provide a stop or support for an end section of the camming arm 74a when the cartridge is not in use.

Figure 5:
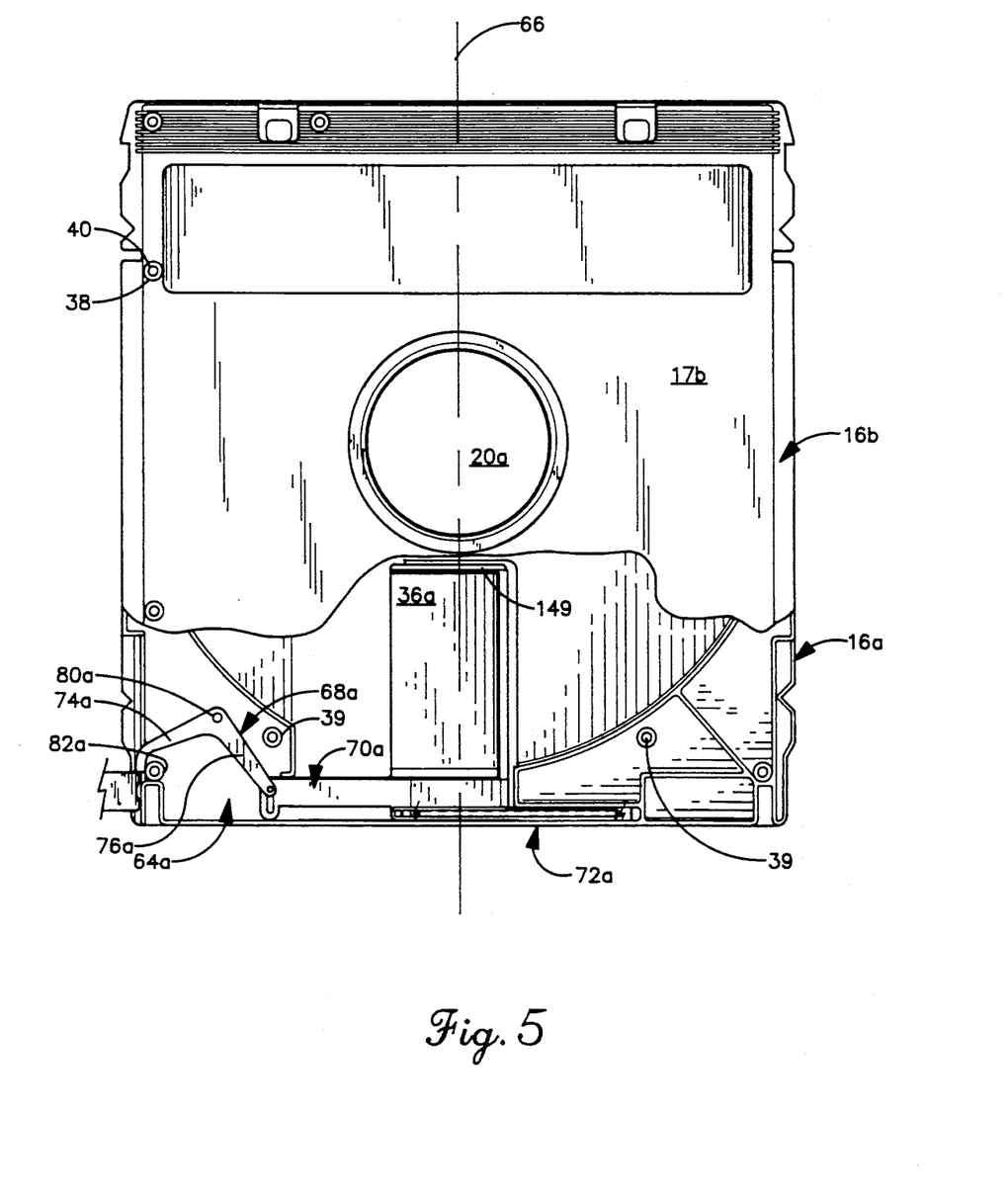
FIG. 5 is a broken-away, top plan view of the cartridge particularly illustrating one of the door control assemblies when the cartridge is in a non-use state.
Figure 6:
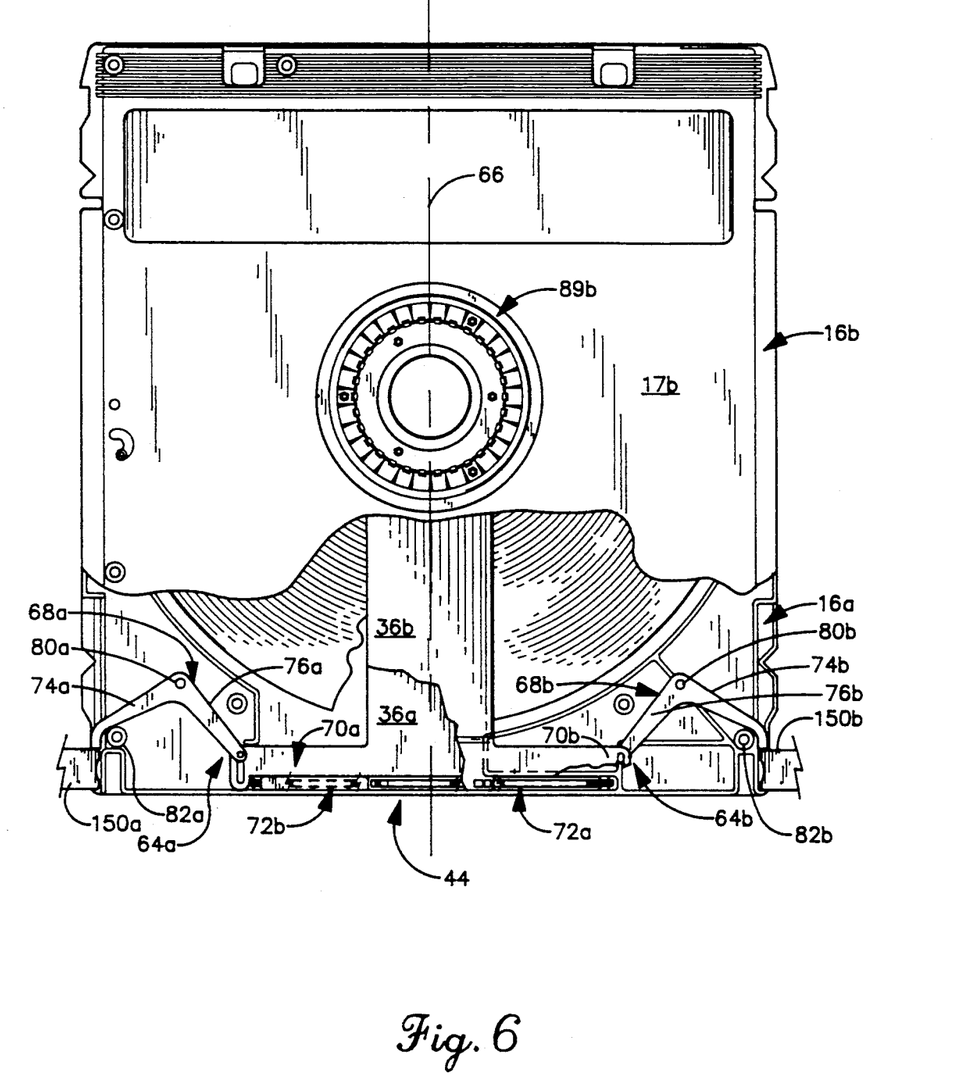
FIG. 6 is a broken-away, top plan view of the cartridge particularly illustrating both of the door control assemblies when the cartridge is in a non-use state.

Door 36a (FIGS. 5 and 6) is biased in a closed position through use of biasing mechanism 72. Biasing mechanism 72, which in the preferred embodiment is a tension coiled spring, has two ends, one of which is secured to an inner surface of cover plate 16a and another end of which is secured to a section of door 36a or interconnecting link 70a. Door 36a is coupled to control arm 68a by way of interconnecting link 70a. As illustrated in FIG. 5, when cartridge 10 is out of the disk drive, i.e. in a non-use state, control arm 68a is urged in a counter-clockwise direction by biasing mechanism 72a and an end section of camming arm 74a rests against post 82a, so that first door 36a is disposed in a closed position and door aperture 18a is covered. Conversely, for door control assembly 64b (FIG. 6) and door 36b, when cartridge 10 is not in use, control arm 68b is rotated in a clockwise direction and an end section of camming arm 74b rests against post 82b such that door 36b covers the door aperture 18b.

Figure 7:
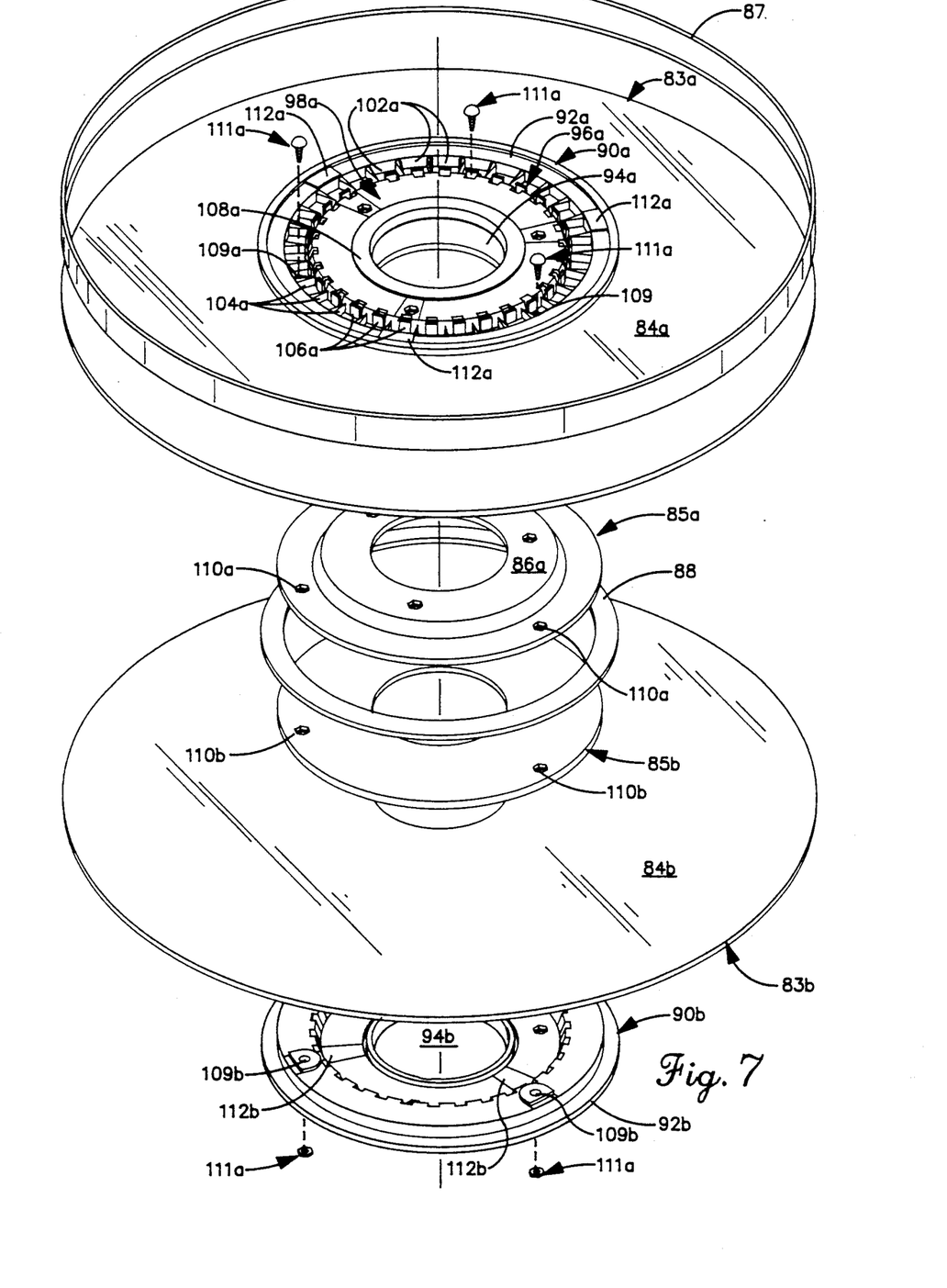
FIG. 7 is an exploded, isometric view of the cartridge with the cover plate as well as doors and door opening assemblies associated therewith broken away.
Figure 8:
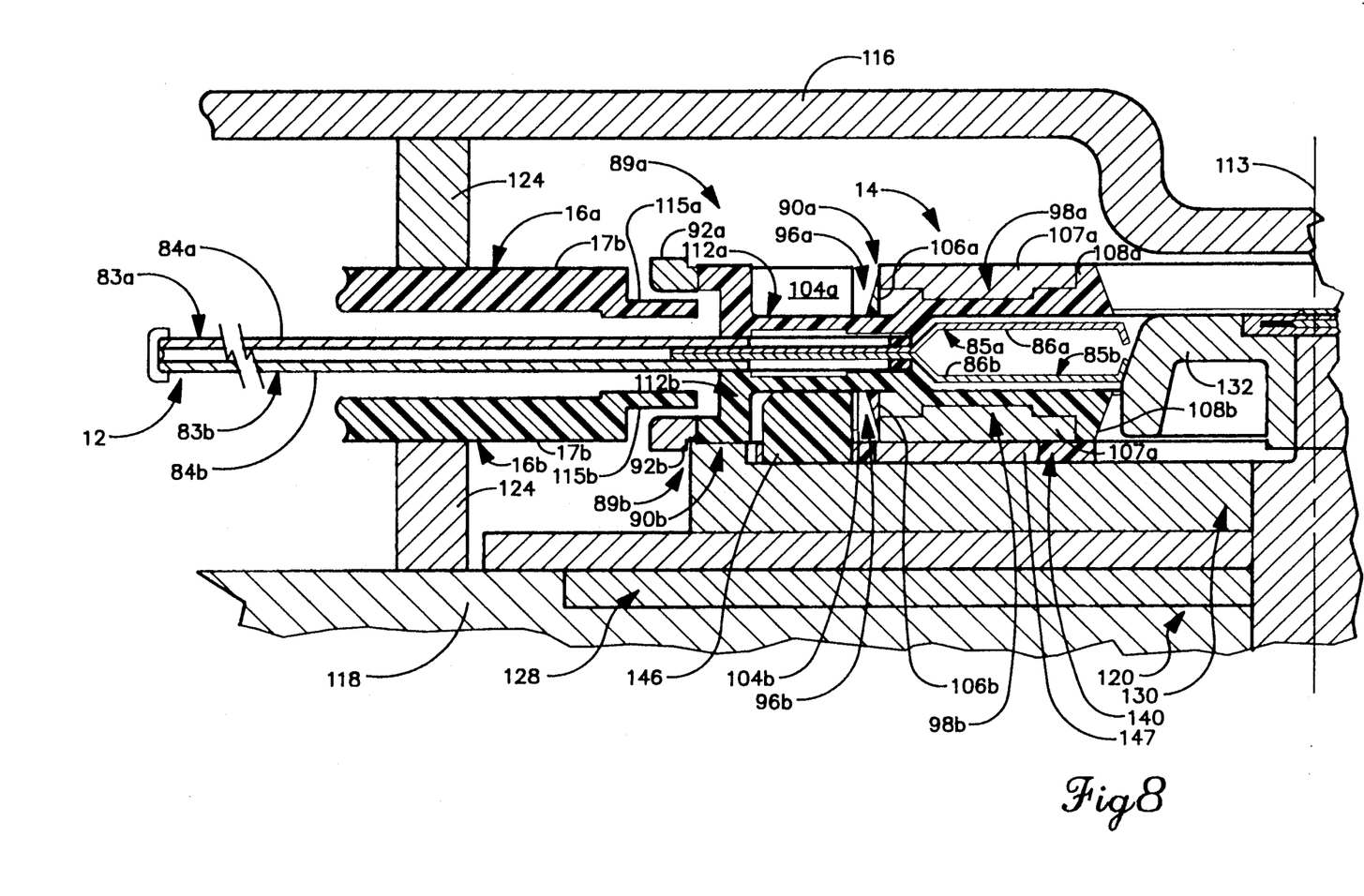
FIG. 8 is a partial vertical cross-sectional view of the cartridge when the same is contained within the disk drive.

Referring to FIGS. 7 and 8, the relationship of hub assembly 14 to disk 12 is illustrated. Disk 12 includes disk halves 83a and 83b with respective surfaces 84a and 84b. In one example, the disk 12 has a diameter of approximately 12 inches. Media insert disks 85a and 85b, are employed to space, in part, disk halves 83a and 83b, and to facilitate the coupling of hub assembly 14 to disk 12. Media insert disks 85a and 85b include raised portions 86a and 86b, respectively. Rings 87 and 88 (FIG. 7) are provided for press fitting disk halves 83a and 83b together. Additionally, information, such as servo information, is stored on the disk surfaces 84a and 84b in the form of reverse spirals to facilitate double sided operations. That is, the spiral applied on disk surface 84a is reversed with respect to the spiral applied to surface 84b.

Hub assembly 14 includes hub subassemblies 89a and 89b, with hub subassembly 89a including a hub 90a. Hub 90a, which in one example has a diameter of about 100 mm, is provided with an outer rim 92a and a receiving aperture 94a. Disposed between outer rim 92a and receiving aperture 94a are first channel 96a and second channel 98a. First channel 96a is partitioned into a plurality of pockets 102a each of which is defined by two of partition members 104a and a support member 106a. As illustrated in FIGS. 7 and 8, an annular raised portion 108a and the support members 106a form second channel 98a. In the preferred embodiment, an annular strip of ferromagnetic material, such as steel ring 107a (FIG. 8), is firmly secured within second channel 98a. Moreover, as further illustrated in FIGS. 7 and 8, the raised portion 86a of media insert disk 85a fits under second channel 98a when hub subassembly 89a is clamped onto disk half 83a.

A plurality of fastener apertures (FIG. 7) 109a and 109b are disposed along the surfaces of hubs 90a and 90b, respectively, while a plurality of fastener apertures 110a and 110b are disposed along surfaces of media insert disks 85a and 85b, respectively, for purposes of coupling the hub assembly 14 to disk 12 by means of conventional fasteners, such as nut and bolt arrangements 111a. While in FIG. 7 apertures 109a are not shown, in the most preferred embodiment, fastener apertures 109a are each located in one of pockets 102a.

Hub 90a is advantageously provided with a plurality of resilient fingers 112a, the significance of which will be explained in further detail below. As best illustrated in FIG. 8, in the preferred embodiment, fingers 112a, extend radially from receiving aperture 94a to outer rim 92a. When cartridge 10 is in a non-use state, an upper section of each of resilient fingers 112a extends slightly above partition members 104a and is disposed just below an upper surface of outer rim 92a. Each of resilient fingers 112a, during the non-use state, is spaced slightly from disk surface 84a.

Various significant features associated with the present invention are further illustrated by FIG. 8. While FIG. 8 depicts a partial view of half of the disk drive with cartridge 10 inserted therein, all of the details necessary to understand the arrangement are illustrated in FIG. 8 since the other half which is not shown, is identical in structure to the half that is shown. As should be appreciated, disk 12 and hub assembly 14 rotate, during operation, about an axis 113, which represents the center of rotation for the disk 12 and hub assembly 14.

In one preferred embodiment, cover plates 16a and 16b include opposing deformable walls 114a and 114b (FIG. 3) which bulge slightly when the same are not compressed. As will be discussed in further detail below, the bulging of wall 114a considerably immobilizes the hub 90a when cartridge 10 is not in use. That is an annular section 115a (FIG. 8) abuts outer rim 92a when cartridge 10 is in the non-use state causing section 115a to rub against a surface of outer rim 92a when hub assembly 14 is rotated. Until wall 114a is pressed inwardly, disk 12 tends not to rotate freely.

Additionally, the disk drive includes an upper base plate 116 and a lower base plate 118 into which a spindle/motor assembly 120 is mounted. As should be appreciated, the disk drive can be, and in some preferred embodiments is, mounted such that base plates 116 and 118 are disposed laterally of the cartridge 10 during use thereof. Mounted to each of base plates 116 and 118 are projections 124, the significance of which will be discussed in further detail below.

Figure 9:
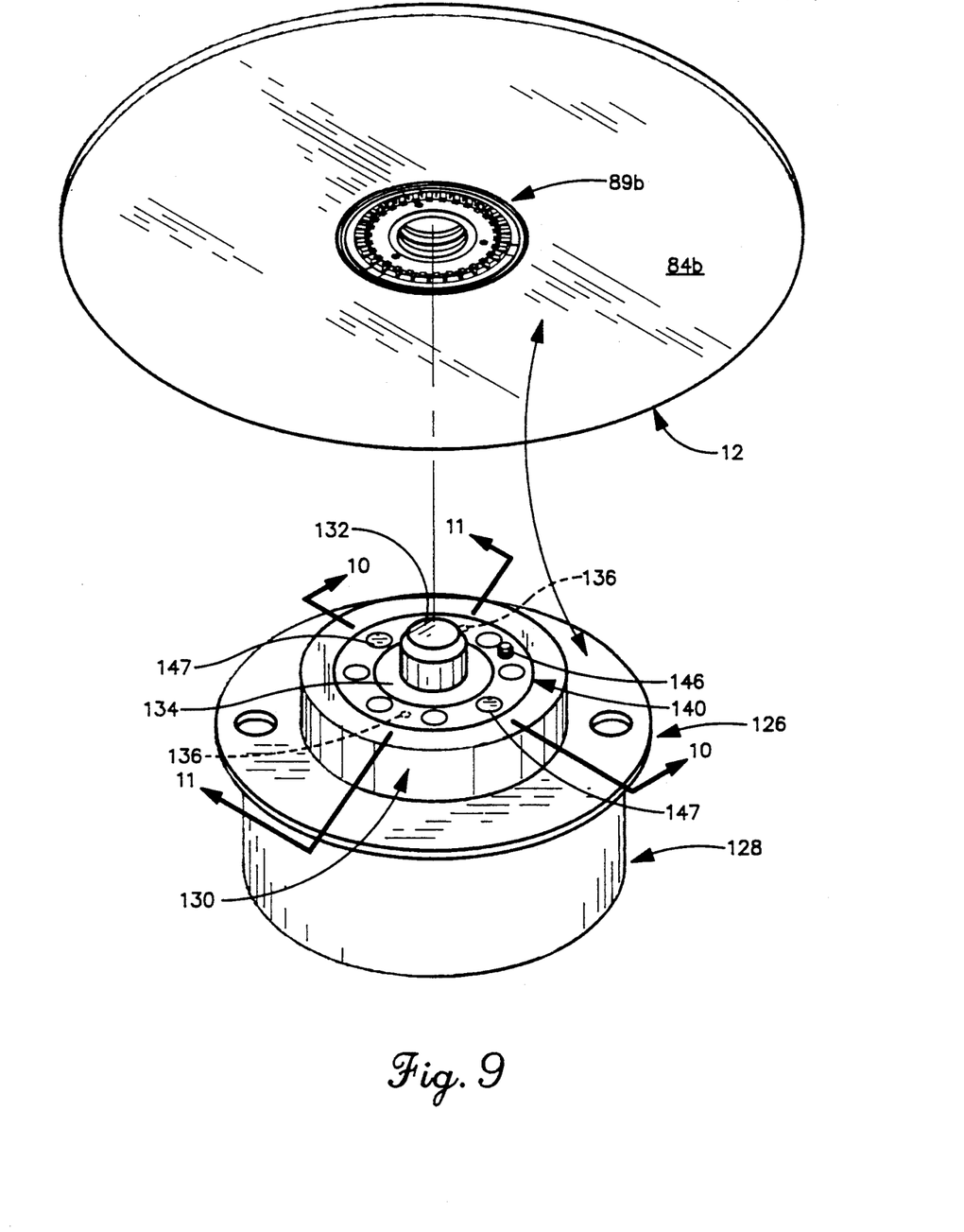
FIG. 9 is a perspective view of the cartridge, with the cover plates, doors and door opening assemblies associated therewith broken away, being mounted on a spindle/motor assembly employed in the disk drive.
Figure 10:
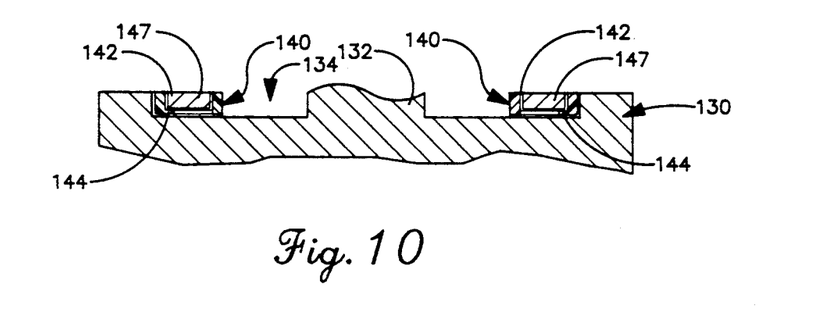
FIG. 10 is a partial, vertical cross-sectional view of the spindle/motor assembly taken along the plane 9—9 of FIG. 9.
Figure 11:
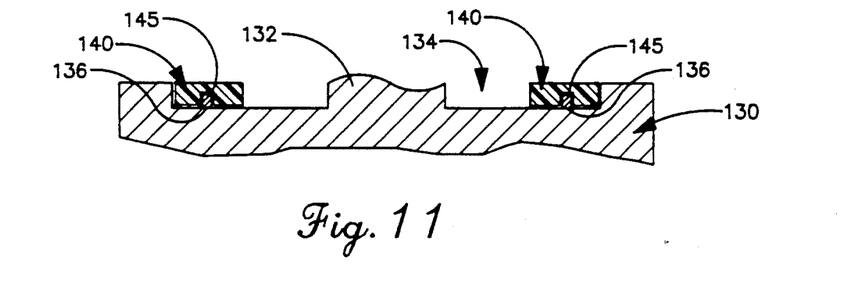
FIG. 11 is a partial, vertical cross-sectional view of the spindle/motor assembly taken along the plane 10—10 of FIG. 9.

Disk 12 is driven by transferring torque from spindle/motor assembly 120 to hub assembly 14. Referring to FIGS. 8 and 9, the basic arrangement by which torque is transferred to disk 12 is illustrated. Spindle/motor assembly 120 includes a spindle subassembly 126 and a motor 128. The spindle subassembly 126 includes a spindle base 130, which is rotatably mounted to motor 128, and a centering bump 132. As illustrated in FIGS. 9-11, spindle base 130 has an annular channel 134, which circumscribes centering bump 132 and in which pins 136 are mounted.

A torque transferring plate 140 is adapted to be received within channel 134. Torque transferring plate 140 includes an annular strip of plastic with a plurality of apertures 142 formed therein. In one preferred embodiment, the apertures are slightly closed off along the bottommost opening thereof (FIG. 9) by a support strip 144 for receiving one or more magnets 147. As illustrated in FIGS. 9 and 11, torque transferring plate 140 further includes apertures 145 disposed along a bottom portion thereof for receiving pins 136 to secure torque transferring plate 140 to spindle base 130. A torque transferring bump 146 is, in the preferred embodiment, integrally connected to torque transferring plate 140 for reception by one of pockets 102a or 102b during rotation of disk 12.

Figure 12:
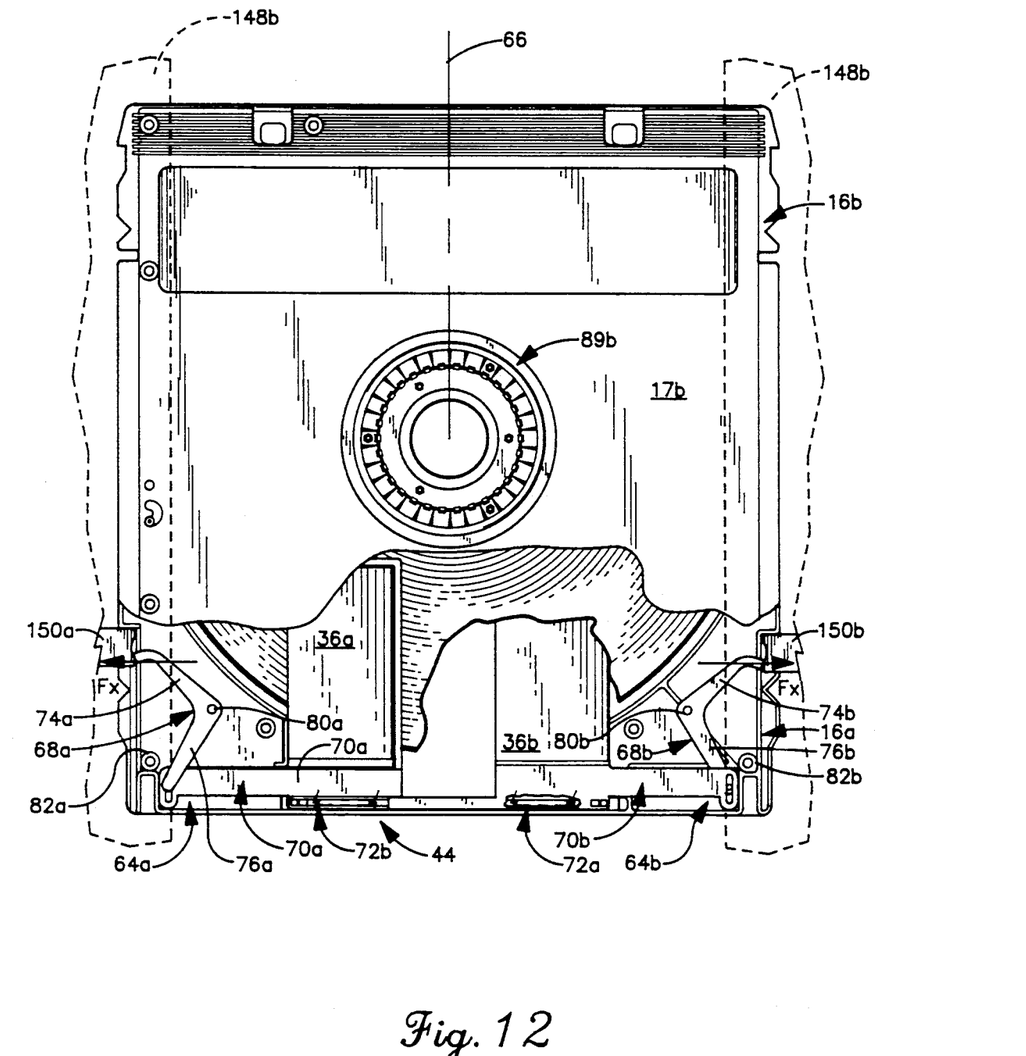
FIG. 12 is a broken-away, top plan view of the cartridge particularly illustrating operation of the door control assemblies when the cartridge is inserted within the disk drive.

Assembly of cartridge 10 can be understood by reference to FIGS. 1 and 5-8. Prior to fastening cover plates 16a and 16b together, it is necessary to secure disk 12 to hub assembly 14 as well as to position doors 36a and 36b under door apertures 18a and 18b. As illustrated by FIG. 5, door 36a is further secured to the interior surface of cover plate 16a by use of a flange 149a. Door control assemblies 64a and 64b (FIGS. 5 and 6) are secured to cover plates 16a and 16b respectively and biased by securing portions of biasing mechanisms 72a and 72b to inner surfaces of cover plates 16a and 16b, respectively. To secure disk 12 to hub assembly 14, portions of media insert disks 85a and 85b are sandwiched between disk halves 83a and 83b (FIGS. 7 and 8) and that sandwiched arrangement is positioned between cover plates 16a and 16b such that raised portions 86a and 86b protrude from hub apertures 20a and 20b. Subsequent to securing cover plates 16a and 16b together by use of screws 40, hubs 90a and 90b are secured together by use of nut and bolt assemblies 111a and 111b. p Operation of cartridge 10 is illustrated by reference to FIGS. 8-9 and 12. The disk drive includes U-shaped channels 148a and 148b (FIG. 12) having cam following bumps 150a and 150b disposed therein. As the leading edge 44 of cartridge 10 is inserted into the channels, end sections of camming arms 74a and 74b, which protrude through slots 60a and 60b, respectively (FIG. 4), come into contact with bumps 150a and 150b. As the user continues to push cartridge 10 into the disk drive, control arms 68a and 68b rotate through, a desired arc while camming arms 74a and 74b ride freely away from the leading edge 44 via recesses 58a and 58b as well as slots 60a and 60b. As further illustrated in FIG. 12, contact bumps 150a and 150b continue to rotate camming arms 74a and 74b until, as illustrated in FIG. 8, one of hubs 90a and 90b is positioned over spindle base 130. As should be appreciated, each of contact bumps 150a and 150b is eccentric (FIG. 12) so that the end of camming arms 74a and 74b can seek an ideal resting position, so that expulsion of cartridge 10 from the channels is alleviated. In one example contact bumps 150a and 150b each have a back angle of about 2°.

Due to the design of door control assemblies 64a and 64b, various significant features are provided by cartridge 10. First, the force vectors generated between the camming arm 74a (FIG. 12) and contact bump 150a as well as camming arm 74b and contact bump 150b is coaxial with the axis normal to the central axis 66 of cartridge 10. This provides for a virtual elimination of forces in the direction coaxial with central axis 66 and further aids in alleviating expulsion of cartridge 10 from the disk drive. Moreover, since the generated forces are equal in magnitude and opposite in direction, torquing of the cartridge 10 within the disk drive is also alleviated.

Second, the positioning of door control assemblies 64a and 64b contribute to the versatility of cartridge 10. In particular, due to the fact that torque transfer can be provided to cartridge 10 from either side, the disk 12 can be accessed with the optical read/write heads from either side. Also, because door control assemblies 64a and 64b are positioned along the same axis, i.e., the axis normal to the central axis 66, cartridge 10 can be used with equal facility in the disk drive in at least two positions. In other words, with respect to operation, it does not matter whether cartridge 10 is inserted with cover plate surface 17a facing the upper base plate 116 or the lower base plate 118. With the ability to simultaneously read and/or write on both sides of the disk without flipping the cartridge, as in many prior art jukebox arrangements, jukebox operation is simplified and cost reductions are achieved.

As cartridge 10 is inserted into the disk drive, cover plates 16a and 16b, which as mentioned above normally bulge slightly (FIGS. 4 and 8) are pressed inward by projections 124. This causes the annular sections 115a and 115b of cover plates 16a and 16b, which normally abut outer rims 92a and 92b of hubs 90a and 90b, to be displaced or released from the outer rims 92a and 92b. Once hubs 90a and 90b are released, disk 12 is free to rotate.

In one example, sensors (not shown) are aligned along U-shaped channels 148a and 148b to monitor the insertion of cartridge 10 into the disk drive as well as to determine whether the disk 12 should be rotated clockwise or counter-clockwise and whether writing on the disk 12 is to be permitted. Direction of rotation will depend on the positioning of the spirals of information with respect to the read/write heads. Additionally, the ability to write on disk 12 will depend upon whether slide piece 54 (FIG. 1) is in an open or closed position. Once the sensors indicate that cartridge 10 has been completely inserted within the disk drive, and that both of the direction of disk rotation and the status of the write protect function have been set, spindle base 130 (FIGS. 8 and 9) is brought into contact with one of hub subassemblies 90a and 90b. As spindle base 130 approaches one of hubs 90a and 90b, the centering bump 132 is received by one of receiving apertures 94a and 94b and the torque transfer bump 146 is received by one of pockets 102a or 102b.

Referring to FIG. 8, as hub 90b is brought into contact with spindle base 130, steel ring 107b is attracted toward magnet element 147 so that hub assembly 14 is firmly held against spindle base 130 during rotation of disk 12. Centering of hub assembly 14 with respect to spindle base 130 is further facilitated by the insertion of centering bump 132 into receiving apertures 94a, 94b. Moreover, as spindle base 130 is brought into contact with resilient fingers 112b, a ridge disposed along the outer periphery of spindle base 130 forces end portions of resilient fingers 112b upward such that the end portions of resilient fingers 112b contact disk surface 84b, thus leveling disk 12 for accurate reading of the same by the optical read/write heads. In one example, three of fingers 112b, which are spaced equidistantly about hub 90b, are employed to provide for leveling. It follows from the discussion thus far that the exemplary operation explained through use of FIG. 8 would apply equally for the case in which hub 90a is brought into contact with the spindle base 130.

It should be appreciated that the design of the hub assembly 14 with respect to pockets 102a and resilient fingers 112a advantageously enhances the operation of cartridge 10 within the disk drive. Regarding pockets 102a, there is no requirement, as in many embodiments disclosed in the prior art, that the torque transfer bump 146 actually "seek" a position for seating of the same. In particular torque transfer bump 146, which is typically constructed of metal, does not scrape the surface of hub 90a, which is typically constructed of plastic, and thus wear on hub 90a is reduced since the torque transfer bump 146 is almost immediately seated within one of pockets 102a as the spindle base 130 is brought into contact with hub 90a.

Regarding the function of resilient fingers 112a, leveling of disk 12 through use of resilient fingers 112a insures that accurate read/write operations will be achieved. It will be appreciated by those skilled in the art that read/write operations are optimized when the disk 12 is properly leveled as discussed above.

In the foregoing description, it will be readily appreciated by those skilled in the art that modifications may be made to the invention without departing from the concepts disclosed herein. Such modifications are to be considered as included in the following claims unless these claims by their language expressly state otherwise.

We claim:

1. A disk cartridge having a disk including first and second surfaces with the disk cartridge being insertable and removable from a disk drive apparatus, the disk cartridge comprising:

a housing having opposing first and second major surfaces and first and second minor surfaces substantially normal to and located between edges of said first and second major surfaces, wherein said first minor surface is substantially opposite said second minor surface;

first and second openings in said first and second major surfaces adjacent to the first and second disk surfaces, respectively;

first and second doors slidably mounted relative to said first and second major surfaces for covering said first and second openings, respectively, when the disk cartridge is not in the disk drive apparatus;

a first recess located in said first minor surface and a second recess located in said second minor surface, said first recess for receiving a first guide projection of the disk drive apparatus upon insertion of a disk cartridge into the disk drive apparatus, said second recess for receiving a second guide protection of the disk drive apparatus upon insertion of a disk cartridge into the disk drive apparatus; wherein said first guide projection has a first eccentric surface that faces said first recess and said second guide surface has a second eccentric surface that faces said second recess;

first and second means for biasing said first and second doors, respectively, over said first and second openings;

first door opening means for opening said first door by cooperating with said first guide projection; and second door opening means for opening said second door by cooperating with said second guide projection;

wherein said first door opening means includes a first arm that projects through a first slot in said first minor surface and into said first recess and is adapted for interacting with said first guide projection to open said first door, said second door opening means includes a second arm that projects through a second slot in said second minor surface and into said second recess and is adapted for interacting with said second guide projection to open said second door, wherein both a first area of contact between said first arm and said first guide projection and a second area of contact between said second arm and said second guide projection change during insertion of the disk cartridge into said disk drive apparatus and when the disk cartridge is no longer being inserted relative to the disk drive apparatus so that said first door and said second door are open and the disk can be accessed for reading/writing, said first arm is being urged against said first eccentric surface to hold said first door open and said second arm is being urged against said second eccentric surface to hold said second door open.

2. A disk cartridge, as claimed in claim 1, wherein:
each of said first and second means for biasing includes a tension coiled spring having first and second ends, said first end of said spring being operatively connected to an inner surface of said housing and said second end of said spring being operatively connected to one of said first and second doors.

3. A disk cartridge, as claimed in claim 2, wherein:
each of said first and second door opening means includes a linking member connected to said first and second doors, respectively, each of said linking members being moved using said respective spring in substantially opposite directions but said opposite directions both being substantially normal to the direction of insertion of the disk cartridge into the disk drive apparatus.

* * * * *